US012809788B2

(12) United States Patent
Xu et al.

(10) Patent No.: US 12,809,788 B2
(45) Date of Patent: Nov. 24, 2026

(54) SHARED MEMORY MANAGEMENT METHOD, VIRTUAL MACHINE MONITOR, AND COMPUTING DEVICE

(71) Applicant: ALIPAY (HANGZHOU) INFORMATION TECHNOLOGY CO., LTD., Hangzhou (CN)

(72) Inventors: Yiling Xu, Hangzhou (CN); Shuang Liu, Hangzhou (CN); Ran Duan, Hangzhou (CN); Shoumeng Yan, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 27 days.

(21) Appl. No.: 18/680,845

(22) Filed: May 31, 2024

(65) Prior Publication Data

US 2024/0403231 A1 Dec. 5, 2024

(30) Foreign Application Priority Data

Jun. 1, 2023 (CN) ......................... 202310644917.4

(51) Int. Cl.
*H04L 15/16* (2006.01)
*G06F 9/455* (2018.01)
(Continued)

(52) U.S. Cl.
CPC ...... *G06F 12/1475* (2013.01); *G06F 9/45558* (2013.01); *G06F 12/0891* (2013.01); *G06F 2009/45587* (2013.01)

(58) Field of Classification Search
CPC ............. G06F 12/1475; G06F 9/45558; G06F 12/0891; G06F 2009/45587;
(Continued)

(56) References Cited

U.S. PATENT DOCUMENTS 8,307,191 B1 * 11/2012 Jain ..................... G06F 12/1036 711/202
2007/0016755 A1 * 1/2007 Pratt .................. G06F 12/1009 711/E12.059
(Continued)

FOREIGN PATENT DOCUMENTS

CN 116894275 9/2023

*Primary Examiner* — Berhanu Shitayewoldetsadik
(74) *Attorney, Agent, or Firm* — Fish & Richardson P.C.

(57) ABSTRACT

Shared memory management methods and apparatuses are provided. In an implementation, an apparatus comprises a virtual machine monitor, a virtual machine, and a trusted execution environment (TEE). The virtual machine monitor is configured to determine, based on the address information, whether a first address is comprised in the shared memory when a page fault occurs in response to the trusted part requests to access the first address, and in response to determining that the first address is comprised in the shared memory, send an interrupt notification to the virtual machine. The virtual machine is configured to: in response to the interrupt notification and determining, based on the address information, that the first address is comprised in the shared memory, validate a first page table entry in the first page table, and return a response message to the virtual machine monitor, wherein the first page table entry comprises address mapping information of a first page that comprises the first address.

20 Claims, 8 Drawing Sheets

(51) Int. Cl.

| | |
|---|---|
| ***G06F 9/50*** | (2006.01) |
| ***G06F 12/00*** | (2006.01) |
| ***G06F 12/0891*** | (2016.01) |
| ***G06F 12/1009*** | (2016.01) |
| ***G06F 12/14*** | (2006.01) |
| ***G06F 13/42*** | (2006.01) |

(58) Field of Classification Search
CPC ........... G06F 2009/45583; G06F 9/544; G06F 11/302; G06F 11/3051; G06F 2009/45562
USPC ............................................................ 726/26
See application file for complete search history.

(56) References Cited

U.S. PATENT DOCUMENTS

| | | | | |
|---|---|---|---|---|
| 2009/0113110 | A1* | 4/2009 | Chen | G06F 9/45558 718/1 |
| 2015/0347300 | A1* | 12/2015 | Gschwind | G06F 3/0644 711/130 |
| 2016/0364341 | A1* | 12/2016 | Banginwar | G06F 12/145 |
| 2017/0123999 | A1* | 5/2017 | Aslot | G06F 12/10 |
| 2018/0129611 | A1* | 5/2018 | Parker | G06F 12/1483 |
| 2018/0189190 | A1* | 7/2018 | Kaplan | G06F 9/45545 |
| 2018/0232320 | A1* | 8/2018 | Raval | G06F 12/1081 |
| 2022/0188244 | A1* | 6/2022 | Ambula | G06F 12/1009 |

* cited by examiner

SHARED MEMORY MANAGEMENT METHOD, VIRTUAL MACHINE MONITOR, AND COMPUTING DEVICE

CROSS-REFERENCE TO RELATED APPLICATIONS

This application claims priority to Chinese Patent Application No. 202310644917.4, filed on Jun. 1, 2023, which is hereby incorporated by reference in its entirety.

TECHNICAL FIELD

One or more embodiments of this specification are associated with the computer field, and in particular, with a shared memory management method, a virtual machine monitor, and a computing device.

BACKGROUND

The virtualization technology solution provides the flexibility to carry heterogeneous systems on the same hardware platform while implementing high reliability and a fault control mechanism to ensure secure isolation between different application programs or between components included in the same application program. In a virtualization technology-based trusted execution environment (TEE), a virtual machine monitor (VMM, or referred to as Hypervisor) can be used to implement memory isolation between a trusted part and an untrusted part of a target application program.

SUMMARY

One or more embodiments of this specification provide a method for managing a shared memory in a computing device, a virtual machine monitor, and a computing device.

According to a first aspect, a method for managing a shared memory in a computing device is provided. A virtual machine monitor, a virtual machine, and a TEE are deployed in the computing device, and an untrusted part and a trusted part of a target application program individually run in the virtual machine and the TEE. Address information of the shared memory is configured in the virtual machine and the virtual machine monitor, the virtual machine maintains a first page table of the untrusted part, and the virtual machine monitor maintains a second page table of the trusted part. The method includes: The virtual machine monitor determines, based on the address information, whether a first address is included in the shared memory when a page fault occurs when the trusted part requests to access the first address, and if yes, sends an interrupt notification to the virtual machine; the virtual machine ensures that a first page table entry has been validated in the first page table when determining, based on the address information in response to the interrupt notification, that the first address is included in the shared memory, and returns a response message to the virtual machine monitor, where the first page table entry includes address mapping information of a first page that includes the first address; and the virtual machine monitor validates a second page table entry corresponding to the first page in the second page table based on the address mapping information in response to the response message.

In some possible implementations, the virtual machine monitor maintains first state information, a value of the first state information includes a first state value or a second state value, the first state value is used to indicate that a new page table entry is allowed to be validated in the second page table, and the second state value is used to indicate that a new page table entry is prohibited from being validated in the second page table. Before the second page table entry corresponding to the first page is validated in the second page table based on the address mapping information, the method further includes: It is determined, based on the first state information, whether the second page table entry is allowed to be validated.

In some possible implementations, the method further includes: The virtual machine sends a first start message to the virtual machine monitor, where the first start message indicates a second page corresponding to a third page table entry that is to be invalidated by the virtual machine monitor, and the second page is included in the shared memory; the virtual machine monitor sets the first state information to the second state value, and invalidates the third page table entry corresponding to the second page in the second page table; the virtual machine invalidates a fourth page table entry corresponding to the second page in the first page table, and sends a first end message to the virtual machine monitor; and the virtual machine monitor sets the first state information to the first state value in response to the first end message.

In some possible implementations, the virtual machine includes an operating system and a page table entry synchronization driver. The method further includes: The page table entry synchronization driver receives a second start message from the operating system, where the second start message indicates a third page corresponding to a fifth page table entry that is to be invalid by the operating system; the page table entry synchronization driver determines, based on the address information in response to the second start message, whether the third page indicated by the second start message is the second page included in the shared memory; and the sending a first start message to the virtual machine monitor includes: the first start message is sent to the virtual machine monitor when the third page indicated by the second start message is the second page included in the shared memory.

In some possible implementations, the method further includes: The page table entry synchronization driver receives a second end message from the operating system, where the second end message indicates the third page corresponding to the fifth page table entry that has been invalidated in the operating system; the page table entry synchronization driver determines, based on the address information in response to the second end message, whether the third page indicated by the second end message is the second page included in the shared memory; and the sending a first start message to the virtual machine monitor includes: the first start message is sent to the virtual machine monitor when the third page indicated by the second end message is the second page included in the shared memory.

In some possible implementations, the page table entry synchronization driver maintains second state information, a value of the second state information includes a third state value or a fourth state value, the third state value is used to indicate that the address information of the shared memory is allowed to be updated, and the fourth state value is used to indicate that the address information of the shared memory is prohibited from being updated. The method further includes: The page table entry synchronization driver sets the second state information to the fourth state value in response to the second start message; and the page table entry synchronization driver sets the second state information to the third state value in response to the second end message.

In some possible implementations, the method further includes: The virtual machine obtains an address update request, where the address update request is used to request to update the address information of the shared memory; the virtual machine determines, based on the second state information, whether the address information of the shared memory is allowed to be updated; the virtual machine updates, based on the address update request, the address information of the shared memory that is configured in the virtual machine if the address information of the shared memory is allowed to be updated, and sends an address update notification corresponding to the address update request to the virtual machine monitor; and the virtual machine monitor updates, based on the address update notification, the address information of the shared memory that is configured in the virtual machine monitor.

According to a second aspect, a method for managing a shared memory in a computing device is provided. A virtual machine monitor, a virtual machine, and a TEE are deployed in the computing device, and an untrusted part and a trusted part of a target application program individually run in the virtual machine and the TEE. Address information of the shared memory is configured in the virtual machine and the virtual machine monitor, the virtual machine maintains a first page table of the untrusted part, and the virtual machine monitor maintains a second page table of the trusted part. The method is performed by the virtual machine monitor, and the method includes: It is determined, based on the address information, whether a first address is included in the shared memory when a page fault occurs when the trusted part requests to access the first address, and if yes, an interrupt notification is sent to the virtual machine, so that the virtual machine ensures that a first page table entry has been validated in the first page table when determining, based on the address information, that the first address is included in the shared memory, and returns a response message to the virtual machine monitor, where the first page table entry includes address mapping information of a first page that includes the first address; and a second page table entry corresponding to the first page is validated in the second page table based on the address mapping information in response to the response message.

According to a third aspect, a virtual machine monitor is provided, and the virtual machine monitor is deployed in a computing device. A virtual machine and a TEE are further deployed in the computing device, and an untrusted part and a trusted part of a target application program individually run in the virtual machine and the TEE. Address information of a shared memory is configured in the virtual machine and the virtual machine monitor, the virtual machine maintains a first page table of the untrusted part, and the virtual machine monitor maintains a second page table of the trusted part. The virtual machine monitor includes: a page fault processing unit, configured to determine, based on the address information, whether a first address is included in the shared memory when a page fault occurs when the trusted part requests to access the first address, and if yes, send an interrupt notification to the virtual machine, so that the virtual machine ensures that a first page table entry has been validated in the first page table when determining, based on the address information, that the first address is included in the shared memory, and returns a response message to the virtual machine monitor, where the first page table entry includes address mapping information of a first page that includes the first address; and a page table management unit, configured to validate a second page table entry in the second page table based on the address mapping information in response to the response message.

According to a fourth aspect, a computing device is provided. A virtual machine monitor, a virtual machine, and a TEE are deployed in the computing device, and an untrusted part and a trusted part of a target application program individually run in the virtual machine and the TEE. Address information of a shared memory is configured in the virtual machine and the virtual machine monitor, the virtual machine maintains a first page table of the untrusted part, and the virtual machine monitor maintains a second page table of the trusted part. The virtual machine monitor is configured to determine, based on the address information, whether a first address is included in the shared memory when a page fault occurs when the trusted part requests to access the first address, and if yes, send an interrupt notification to the virtual machine; the virtual machine is configured to ensure that a first page table entry has been validated in the first page table when determining, based on the address information in response to the interrupt notification, that the first address is included in the shared memory, and return a response message to the virtual machine monitor, where the first page table entry includes address mapping information of a first page that includes the first address; and the virtual machine monitor is further configured to validate a second page table entry corresponding to the first page in the second page table based on the address mapping information in response to the response message.

In some possible implementations, the virtual machine monitor maintains first state information, a value of the first state information includes a first state value or a second state value, the first state value is used to indicate that a new page table entry is allowed to be validated in the second page table, and the second state value is used to indicate that a new page table entry is prohibited from being validated in the second page table. The virtual machine monitor is further configured to determine, based on the first state information, whether the second page table entry is allowed to be validated before validating the second page table entry corresponding to the first page in the second page table based on the address mapping information.

In some possible implementations, the virtual machine is further configured to send a first start message to the virtual machine monitor, where the first start message indicates a second page corresponding to a third page table entry that is to be invalidated by the virtual machine monitor, and the second page is included in the shared memory; the virtual machine monitor is further configured to set the first state information to the second state value, and invalidate the third page table entry corresponding to the second page in the second page table; the virtual machine is further configured to invalidate a fourth page table entry corresponding to the second page in the first page table, and send a first end message to the virtual machine monitor; and the virtual machine monitor is further configured to set the first state information to the first state value in response to the first end message.

In some possible implementations, the virtual machine includes an operating system and a page table entry synchronization driver. The page table entry synchronization driver is configured to receive a second start message from the operating system, where the second start message indicates a third page corresponding to a fifth page table entry that is to be invalid by the operating system; the page table entry synchronization driver is further configured to determine, based on the address information in response to the second start message, whether the third page indicated by the second start message is the second page included in the shared memory; and the page table entry synchronization driver is further configured to send the first start message to the virtual machine monitor when the third page indicated by the second start message is the second page included in the shared memory.

In some possible implementations, the page table entry synchronization driver is further configured to receive a second end message from the operating system, where the second end message indicates the third page corresponding to the fifth page table entry that has been invalidated in the operating system; the page table entry synchronization driver is further configured to determine, based on the address information in response to the second end message, whether the third page indicated by the second end message is the second page included in the shared memory; and the page table entry synchronization driver is further configured to send the first start message to the virtual machine monitor when the third page indicated by the second end message is the second page included in the shared memory.

In some possible implementations, the page table entry synchronization driver maintains second state information, a value of the second state information includes a third state value or a fourth state value, the third state value is used to indicate that the address information of the shared memory is allowed to be updated, and the fourth state value is used to indicate that the address information of the shared memory is prohibited from being updated. The page table entry synchronization driver is further configured to set the second state information to the fourth state value in response to the second start message; and is further configured to set the second state information to the third state value in response to the second end message.

In some possible implementations, the virtual machine is further configured to obtain an address update request, where the address update request is used to request to update the address information of the shared memory; determine, based on the second state information, whether the address information of the shared memory is allowed to be updated; update, based on the address update request, the address information of the shared memory that is configured in the virtual machine if the address information of the shared memory is allowed to be updated, and send an address update notification corresponding to the address update request to the virtual machine monitor; and the virtual machine monitor is further configured to update, based on the address update notification, the address information of the shared memory that is configured in the virtual machine monitor.

According to the method, the virtual machine monitor, and the computing device provided in one or more embodiments of this specification, address information of a shared memory corresponding to a target application program is configured in both a virtual machine and a virtual machine monitor, and a trusted part and an untrusted part of the target application program individually run in a TEE and the virtual machine. When a page fault occurs when the trusted part requests to access a first address included in the shared memory, the virtual machine monitor can determine to send an interrupt notification to the virtual machine based on the address information of the shared memory. In a process of processing the interrupt notification, the virtual machine can determine, based on the address information of the shared memory that is maintained by the virtual machine, that the first address expected to access is included in the shared memory corresponding to the target application program, and further ensure that a first page table entry of a first page that includes the first address has been validated in the first page table of the untrusted part, where the first page table entry is used to support the untrusted part in returning a response message to the virtual machine monitor when accessing the first page, so that the virtual machine monitor can validate, in the second page table of the trusted part based on address mapping information of the first page included in the validated first page table entry, a second page table entry used to support the trusted part in accessing the first page. As such, there is no need to reserve a physical memory for the shared memory, and the trusted part and the untrusted part of the target application program can exchange information by accessing the same page in the shared memory, which helps the virtual machine running the untrusted part dynamically manage the shared memory corresponding to the target application program, thereby improving memory usage efficiency.

BRIEF DESCRIPTION OF DRAWINGS

To describe the technical solutions in embodiments of this specification more clearly, the following briefly describes the accompanying drawings needed for describing the embodiments. Clearly, the accompanying drawings in the following description are merely some embodiments of this application, and a person of ordinary skill in the art can still derive other drawings from these accompanying drawings without creative efforts.

DESCRIPTION OF EMBODIMENTS

The following describes in detail the non-limiting embodiments provided in this specification with reference to the accompanying drawings.

Currently, the industry pays great attention to a TEE technology solution. Almost all mainstream chips and software alliances have their own independent TEE solutions, such as a trusted platform module (TPM) in terms of software and software guard extensions (SGX), an ARM TrustZone, and an AMD platform security processor (PSP) that are in terms of hardware. The TEE can act as a black box. Even an operating system layer cannot peep into code and data in the TEE, and only an interface predetermined in the code can perform an operation on the code and the data. In terms of efficiency, due to the black box feature of the TEE, operation in the TEE uses plaintext data, and is not complex cryptographic operation in homomorphic encryption, and therefore, there is almost no loss of efficiency in the computing process.

In the TEE technology, a software guard extension (SGX) technology is used as an example for description. A computing node can create an enclave based on the SGX technology as a TEE for executing a trusted part of a specific application program. In the computing node, a part of area called an enclave page cache (EPC) can be allocated in a memory by using processor instructions newly added in the CPU, for the enclave to camp on. A memory area corresponding to the EPC is encrypted by a memory encryption engine (MEE) inside the CPU, content (code and data in the enclave) in the memory area can be decrypted only in a core of the CPU, and a key used for encryption and decryption is generated and stored in the CPU only when the EPC starts. It can be seen that a security boundary of the enclave includes only the enclave and the CPU, neither privileged software nor unprivileged software can access the enclave, and even an operating system administrator and a virtual machine monitor cannot affect the code and the data in the enclave. Therefore, security is very high. Under the premise of the above security guarantee, the CPU can process the data in the enclave, which has very high operation efficiency. Therefore, both data security and computing efficiency are considered.

Figure 1:
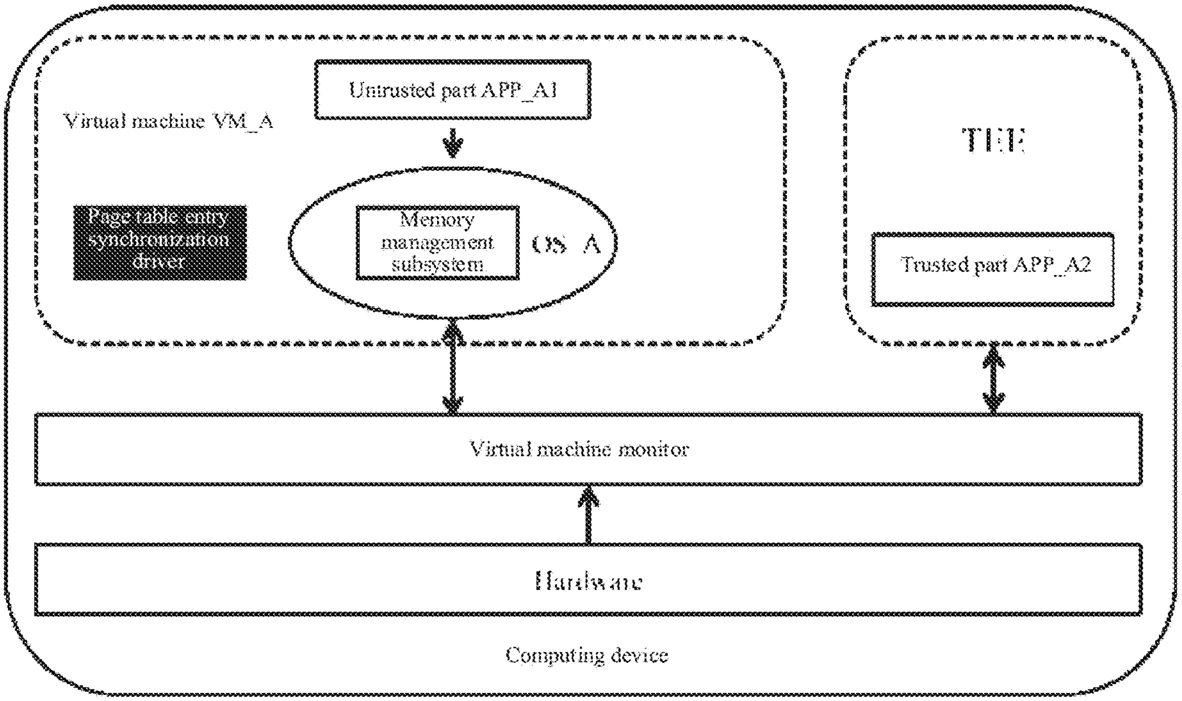
FIG. 1 is an example diagram illustrating a system architecture of a computing device, according to some embodiments of this specification.

FIG. 1 is an example diagram illustrating a system architecture of a computing device, according to some embodiments of this specification. Referring to FIG. 1, a virtual machine monitor and several virtual machines managed by the virtual machine monitor are deployed in the computing device, and the several virtual machines include, for example, a virtual machine VM_A. The virtual machine monitor can directly manage hardware resources of the computing device, and an operating system OS_A of the virtual machine VM_A can be executed on a processor virtualized by using the virtual machine monitor. More specifically, the virtual machine VM_A can use virtualized hardware resources by using the virtual machine monitor. After an untrusted part APP_A1 of a target application program starts to run in the virtual machine VM_A, a TEE can be created in the computing device by using SGX or another possible TEE technology, and a trusted part APP_A2 of the target application program runs in the TEE. The TEE can be a standard virtual machine on which an operating system is deployed, or can be a process-level virtual machine on which an operating system is not deployed.

To enable the trusted part APP_A2 running in the TEE to communicate with the untrusted part APP_A1 running in the virtual machine VM_A, a communication buffer/shared memory corresponding to the target application program can be set in the virtual machine VM_A in advance, and in life cycles of the untrusted part APP_A1 and the trusted part APP_A2, a page included in the shared memory is set to be prohibited from being swapped out by the virtual machine VM_A and the virtual machine monitor. There are many disadvantages in the implementations. For example, because the page included in the shared memory cannot be swapped out, sufficient physical memories need to be reserved for the shared memory. The virtual machine VM_A cannot manage the shared memory, for example, swapping out of a page, page migration, and memory defragmentation, which causes low memory resource utilization. The virtual machine VM_A cannot dynamically adjust a size of the shared memory during running of the target application program.

Embodiments of this specification provide at least a method for managing a shared memory in a computing device, a virtual machine monitor, and a computing device. Address information of a shared memory corresponding to a target application program is configured in both a virtual machine and a virtual machine monitor, and a trusted part and an untrusted part of the target application program individually run in a TEE and the virtual machine. When a page fault occurs when the trusted part requests to access a first address included in the shared memory, the virtual machine monitor can send an interrupt notification to the virtual machine based on the address information of the shared memory. In a process of processing the interrupt notification, the virtual machine can determine, based on the address information of the shared memory that is maintained by the virtual machine, that the first address expected to access is included in the shared memory corresponding to the target application program, and further ensure that a first page table entry of a first page that includes the first address has been validated in the first page table of the untrusted part, where the first page table entry is used to support the untrusted part in returning a response message to the virtual machine monitor when accessing the first page, so that the virtual machine monitor can validate, in the second page table of the trusted part based on address mapping information of the first page included in the validated first page table entry, a second page table entry used to support the trusted part in accessing the first page. As such, there is no need to reserve a physical memory for the shared memory, and the trusted part and the untrusted part of the target application program can exchange information by accessing the same page in the shared memory, which helps the virtual machine running the untrusted part dynamically manage the shared memory corresponding to the target application program, thereby improving memory usage efficiency.

The following describes in detail the technical solutions provided in the embodiments of this specification with reference to the system architecture shown in FIG. 1.

As shown in FIG. 1, a page table entry synchronization driver (denoted as Driver) can be first installed in the virtual machine VM_A. During installation the Driver or after installation of the Driver, the Driver can send a registration request to the operating system OS_A of the virtual machine VM_A, so that a memory management subsystem of the operating system OS_A monitors a page table entry change status of a page table used by an application program that runs relying on the OS_A. When detecting that a certain page table entry in a page table managed by the operating system OS_A is to be invalidated or has been invalidated, the memory management subsystem returns, to the Driver, a page table entry change message that is used to indicate that a corresponding page table entry is to be changed or has been changed. The memory management subsystem is also described as a memory management unit (MMU). In a typical example, when the operating system OS_A is a Linux operating system, the registration request is used to trigger the memory management subsystem to enable a capability of monitoring change_pte in a mmu_notifer mechanism of the Linux operating system.

When the untrusted part APP_A1 of the target application program is started in the virtual machine VM_A, the operating system OS_A allocates address space (denoted as address space Q1) to the untrusted part APP_A1 for use by the untrusted part APP_A1, and then correspondingly maintains a first page table (denoted as page table a1) of the untrusted part APP_A1. The untrusted part APP_A1 applies to the operating system OS_A for the shared memory (denoted as shared memory Q2) corresponding to the target application program, and the operating system OS_A maintains address information of shared memory Q2. In addition, the untrusted part APP_A1 can further request the virtual machine monitor to reserve address space (denoted as address space Q3) used by the trusted part APP_A2 of the target application program. Address space Q1, shared memory Q2, and address space Q3 described above all are included in address space of the virtual machine.

Figure 2:
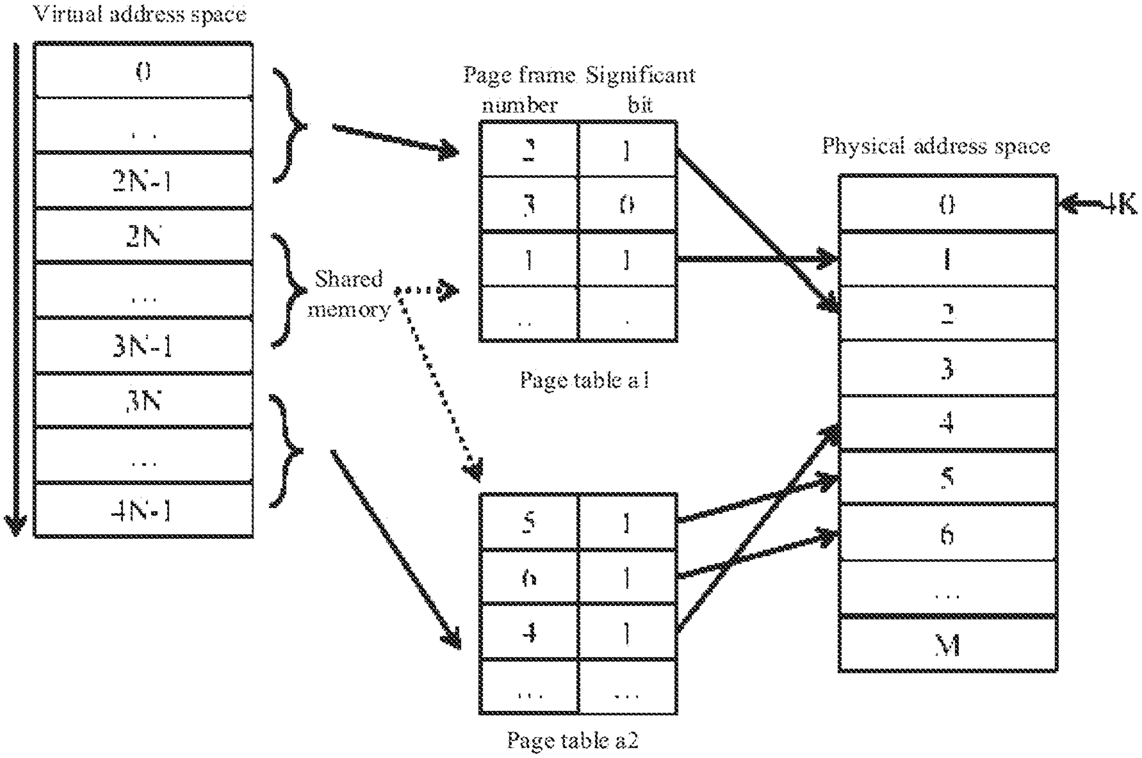
FIG. 2 is an example schematic diagram illustrating of mapping virtual address space to physical address space by using a page table.

For example, as shown in FIG. 2, the memory management subsystem of the operating system OS_A can allocate, for example, pages 0 to 2N−1 in the virtual address space to the untrusted part APP_A1 as address space Q1, and correspondingly maintain page table a1 of the untrusted part APP_A1. In addition, based on the application of the untrusted part APP_A1, the memory management subsystem can use pages 2N to 3N−1 in the virtual address space as shared memory Q2 corresponding to the target application program, and record the address information of shared memory Q2 and a correspondence between shared memory Q2 and the target application program. Based on the application of the untrusted part APP_A1, the virtual machine monitor can reserve pages 3N to 4N−1 as address space Q3 for use by the trusted part APP_A2.

When the virtual machine VM_A creates the TEE corresponding to the target application program in the computing device, and starts the trusted part APP_A2 of the target application program in the TEE, the virtual machine monitor can allocate the pages correspondingly reserved in the virtual address space to the trusted part APP_A2, and correspondingly maintain a second page table (denoted as page table a2) of the trusted part APP_A2. For example, still referring to FIG. 2, the virtual machine monitor can allocate the reserved pages 3N to 4N−1 to the trusted part APP_A2 as address space Q3 for use, and correspondingly maintain page table a2 of the trusted part APP_A2 shown in FIG. 2.

Page table a1 and page table a2 are used to map virtual addresses in address space Q1 and address space Q3 to physical addresses. The virtual machine monitor can further individually maintain extended page tables (EPT) corresponding to page table a1 and page table a2. The extended page table is also usually referred to as an EPT page table, and is used to map a physical address to a real machine address. In some technical scenarios, the virtual addresses in address space Q1 and address space Q3 can also be directly mapped to real machine addresses by using page table a1 and page table a2. It can be understood that, data structures of page table a1 and page table a2 in the example in FIG. 2 are only used to assist in describing the technical solution, and in an actual counting scenario, page table a1 and page table a2 can further have other data structures.

The virtual machine VM_A can send the address information of shared memory Q2 to the virtual machine monitor. For example, the page table entry synchronization driver can obtain the address information of shared memory Q2 from the memory management subsystem of the operating system OS_A and store the address information, and then sends the address information of shared memory Q2 to the virtual machine manager. Both the page table entry synchronization driver and the virtual machine monitor can manage, through an interval tree or other methods, the address information of shared memory Q2 that is configured/stored in the page table entry synchronization driver and the virtual machine monitor.

Figure 3:
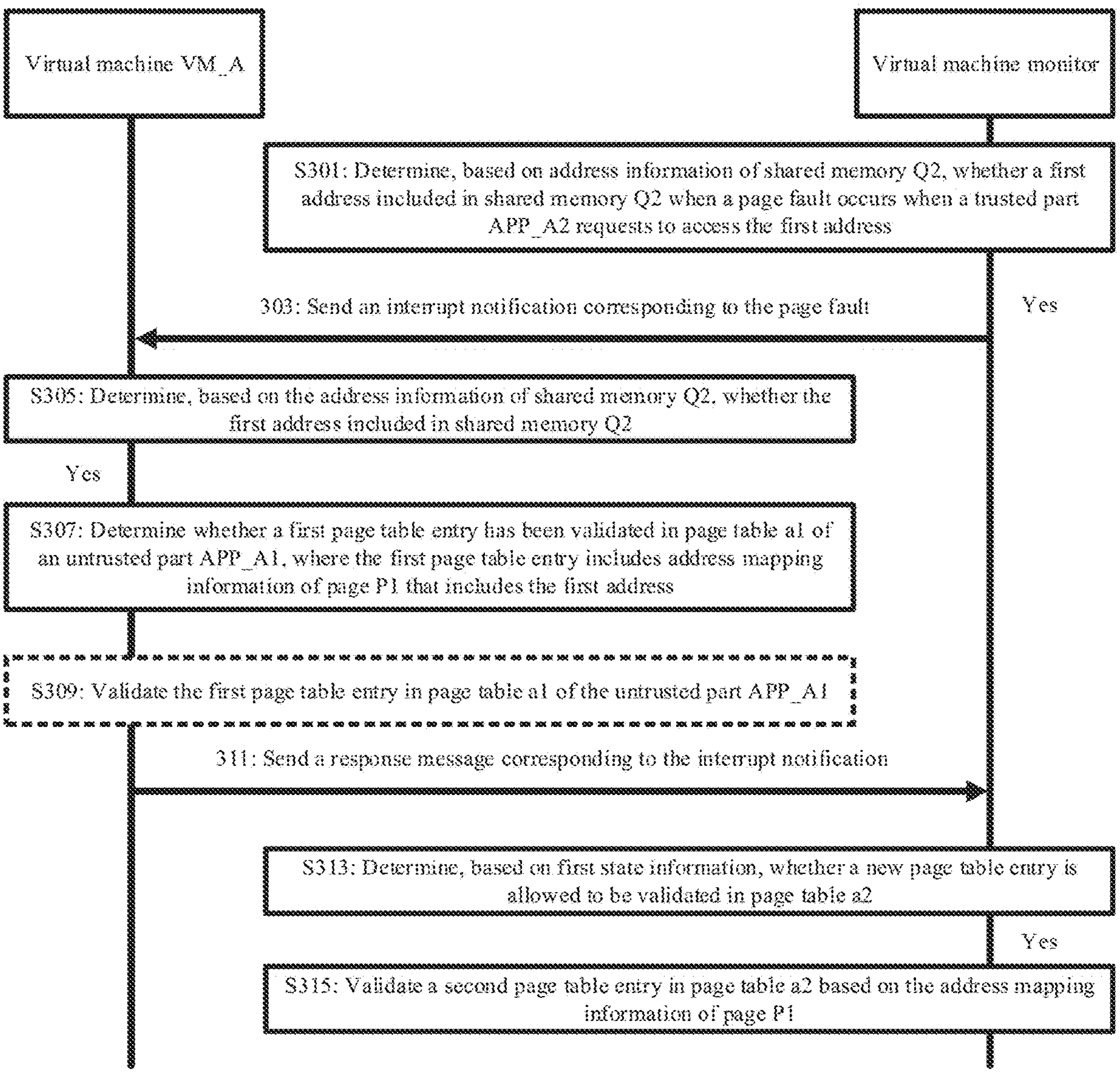
FIG. 3 is a first flowchart illustrating a method for managing a shared memory in a computing device, according to some embodiments of this specification.

After the untrusted part APP_A1 of the target application program is started in the virtual machine VM_A, and the trusted part APP_A2 of the target application program is started in the TEE corresponding to the target application program, referring to FIG. 3, the computing device can perform some or all of the following step S301 to step S315 through mutual cooperation between the virtual machine VM_A and the virtual machine monitor deployed in the computing device, so that the trusted part APP_A2 can communicate with the untrusted part APP_A1.

Step S301: The virtual machine monitor determines, based on the address information of shared memory Q2, whether a first address is included in shared memory Q2 when a page fault occurs when the trusted part APP_A2 requests to access the first address.

When the trusted part APP_A2 requests to access an address included in shared memory Q2 or address space Q3, a page fault possibly occur. For a page fault that occurs when the trusted part APP_A2 requests to access a first address included in address space Q3, the virtual machine monitor can process the page fault, for example, correspondingly validate a certain new page table entry in page table a2.

When a page fault occurs when the trusted part APP_A2 requests to access a first address included in shared memory Q2, where a page table and/or an EPT page table initially created by the virtual machine monitors for the trusted part APP_A2 do not support access to the first address by the trusted part APP_A2, and the page fault is triggered, the virtual machine monitor interrupts execution of the trusted part APP_A2, and then injects the page fault into the operating system OS_A of the virtual machine VM_A through a corresponding interrupt notification.

The virtual machine monitor can further record error information of the page fault, and the error information can include an identifier of the trusted part APP_A2 whose running is interrupted and the first address expected to access. When the first address is included in shared memory Q2, indication information can be further recorded in the error information to indicate that a corresponding page fault is caused by requesting to access shared memory Q2.

When the first address requested by the trusted part APP_A2 to access is included in shared memory Q2, the virtual machine monitor can continue to perform step S303 to send an interrupt notification corresponding to the page fault to the virtual machine VM_A.

The virtual machine monitor injects a related page fault into the virtual machine VM_A through the interrupt notification, so that the virtual machine VM_A can obtain the first address based on the interrupt notification received by the virtual machine VM_A. The interrupt notification can be directly sent to the memory management subsystem of the operating system OS_A, and the memory management subsystem can obtain the first address based on the interrupt notification. In some possible implementations, the interrupt notification can include related information including the first address, for example, include the error information corresponding to the page fault. In other possible implementations, the virtual machine monitor can store the error information corresponding to the page fault in shared space that allows the virtual machine monitor and the virtual machine VM_A to access, and the memory management subsystem can correspondingly read the error information based on the interrupt notification to obtain the first address from the page fault.

After obtaining the first address, the virtual machine VM_A can continue to perform step S305 to determine, based on the address information of shared memory Q2, whether the first address is included in shared memory Q2. The computing device can include one or more TEEs deployed, that is, the virtual machine VM_A can run an untrusted part of one or more application programs. However, the first address is not included in address space of the untrusted part, and therefore, shared memory Q2 that includes the first address needs to be determined by using step S305.

After determining that the first address is included in shared memory Q2, for example, the virtual machine VM_A can determine, by using the memory management subsystem of the operating system OS_A based on the correspondence between shared memory Q2 and the target application program maintained by the virtual machine VM_A, the untrusted part APP_A1 that is running in the virtual machine VM_A and that is included in the target application program, thereby determining page table a1 of the untrusted part APP_A1. As such, the virtual machine VM_A can continue to perform step S307 to determine whether a first page table entry has been validated in page table a1 of the untrusted part APP_A1, where the first page table entry includes address mapping information of page P1 that includes the first address.

Continuing to use an example in which address space Q1 used by the untrusted part APP_A1 includes the pages 0 to 2N−1, a page number P1 of the first page that includes the first address can be obtained through calculation by using a formula P1=INT[X/L], where X represents the first address, L represents a size of a single page, and L can usually be 4K. Further, in page table a1 maintained by the operating system OS_A by using the memory management subsystem of the operating system OS_A, whether the first page table entry corresponding to the first page (that is, page P1) whose page number is P1 has been validated is queried.

The first page table entry can include the address mapping information of page P1. In some possible implementations, a location of the first page table entry in page table a1 can indicate the page number P1. In the first page table entry, a page frame number of a target page frame corresponding to page P1 is recorded in plaintext. In addition, a significant bit used to indicate whether the first page table entry is valid can be further recorded in plaintext. For example, for a single page table entry with a length of 32 bits, 20 most significant bits of the page table entry can be used to store a page frame number, and a certain location in 12 least significant bits of the page table entry can be used as a significant bit. More specifically, when a value of the significant bit is 1, it can indicate that the page table entry including the significant bit is valid/has been validated. In this case, a certain page frame number can be stored in the 20 most significant bits, which correspondingly indicates that a page corresponding to the page table entry has been swapped in. When the value of the significant bit is 0, it can indicate that the page table entry including the significant bit is invalid/has not been validated. In this case, regardless of whether a page frame number is stored in the 20 most significant bits, it indicates that the page corresponding to the page table entry is not swapped in. It should be specially noted that, in some technical scenarios, a page table entry of a single page may not store a page frame number, but directly indicates a real machine address corresponding to the page.

If the first page table entry has been validated in page table a1, the virtual machine VM_A can directly perform the following step S311. Otherwise, the virtual machine VM_A can sequentially perform the following step S309 and step S311.

Step S309: Validate the first page table entry in page table a1 of the untrusted part APP_A1.

In a process of validating the first page table entry, a target page frame in an idle state can be determined from physical address space, and the first page table entry is validated in the first page table based on a page frame number of the determined target page frame.

Step S311: Send a response message corresponding to the interrupt notification to the virtual machine monitor.

The response message can include the address mapping information included in the first page table entry. Alternatively, after receiving the response message, the virtual machine monitor can actively query, from the first page table, the address mapping information included in the first page table entry.

Shared memory Q2 is managed by the operating system OS_A of the virtual machine VM_A. The operating system OS_A can actively swap out a page included in shared memory Q2 based on a memory management policy configured in the operating system OS_A, that is, actively invalidating a page table entry corresponding to the page included in shared memory Q2. To ensure accurate communication between the untrusted part APP_A1 and the trusted part APP_A2, when the page table entry corresponding to the page included in shared memory Q2 is validated, the page table entry corresponding to the page needs to be first validated in page table a1, and then the page table entry corresponding to the page needs to be validated in page table a2. On the contrary, when the page table entry corresponding to the page included in shared memory Q2 is invalidated, the page table entry corresponding to the page needs to be first invalidated in page table a2, and then the page table entry corresponding to the page is validated in page table a1. In addition, it needs to be ensured that in a process in which the virtual machine monitor invalidates a certain page table entry in page table a2, a new page table entry is prohibited from being validated in page table a2. Based on the above-mentioned considerations, the virtual machine monitor can maintain first state information corresponding to page table a2, a value of the first state information includes a first state value or a second state value, the first state value is used to indicate that a new page table entry is allowed to be validated in page table a2, and the second state value is used to indicate that a new page table entry is prohibited from being validated in page table a2. The first state information can be maintained through reference counting or a state machine. How to set the value of the first state information and a function of the first state information are described below in detail.

If the virtual machine monitor maintains the first state information corresponding to page table a2, the virtual machine monitor can perform the following step S313 in response to the response message from the virtual machine VM_A, and determine, based on an execution result of step S313, whether to continue to perform step S315. If the virtual machine monitor does not maintain the first state information corresponding to page table a2, the virtual machine monitor can directly perform the following step S315 in response to the response message from the virtual machine VM_A.

Step S313: Determine, based on the first state information, whether a new page table entry is allowed to be validated in page table a2.

Referring to the above-mentioned description, when the value of the first state information is the first state value, it indicates that a new page table entry is allowed to be validated in page table a2. In this case, step S315 can continue to be performed. When the value of the first state information is the second state value, it indicates that a new page table entry is prohibited from being validated in page table a2. In this case, the computing device can be trapped in the virtual machine VM_A from the virtual machine monitor, so that the virtual machine VM_A resends, based on a specific policy, the response message corresponding to the interrupt notification. Alternatively, the virtual machine monitor can add the address mapping information of page P1 obtained by the virtual machine monitor to a waiting queue, and execution of a subsequent step S315 is allowed to continue only when the virtual machine monitor determines, at a subsequent certain moment, that a new page table entry is allowed to be validated in page table a2.

Step S315: Validate a second page table entry corresponding to page P1 in page table a2 based on the address mapping information of page P1.

Referring to the above-mentioned description, the second page table entry should also include the page frame number corresponding to page P1. In addition, the second page table entry can directly include the page number of page P1, or a location of the second page table entry in page table a2 can indicate the page number of page P1, and a significant bit in the second page table entry needs to be set to a predetermined value indicating that the second page table entry is valid. If the virtual machine monitor maintains an EPT page table for use by the trusted part APP_A2, the virtual machine monitor further needs to correspondingly update the EPT page table.

After the second page table entry corresponding to the effective page P1 is validated in page table a2, the computing device can continue to execute the trusted part APP_A2. For example, when the processor executes instruction A included in the trusted part APP_A2, where instruction A requests to access the first address included in shared memory Q2, in this case, the processor interrupts execution of instruction A. After the virtual machine monitor validates the second page table entry in page table a2, the processor can continue to execute instructions included in the trusted part APP_A2 from instruction A.

In the above-mentioned process, the page table entry corresponding to page P1 that includes the first address in shared memory Q2 is validated in both page table a2 and page table a1 that are individually used by the trusted part APP_A2 located in the TEE and the untrusted part APP_A1 located in the virtual machine VM_A, and the trusted part APP_A2 and the untrusted part APP_A1 can communicate with each other through page P1.

The above-mentioned step S301 to step S315 describe an example process in which the page table entry corresponding to page P1 included in shared memory Q2 is validated in each of page table a1 and page table a2. It can be understood that the computing device can perform a plurality of processes the same as/similar to the above-mentioned step S301 to step S315 to separately validate, in page table a1 and page table a2, a plurality of page table entries corresponding to a plurality of pages included in shared memory Q2.

Based on the above-mentioned step 301 to step 315, shared memory Q2 is managed by the operating system OS_A of the virtual machine VM_A. The operating system OS_A may expect to actively swap out a second page (denoted as page P2) included in shared memory Q2 based on the memory management policy configured in the operating system OS_A, that is, a fourth page table entry corresponding to page P2 is invalidated in page table a1, so that a page frame corresponding to page P2 can be used to perform another transaction. When the operating system OS_A expects to swap out page P2, to separately invalidate a page table entry corresponding to page P2 in page table a1 and page table a2 to prevent the untrusted parts APP_A1 and APP_A2 from continuing to access page P2 to obtain data unrelated to the target application program, the computing device can perform some or all of the following step S401 to step S423 through cooperation between the virtual machine VM_A and the virtual machine monitor.

Optionally, when a page table entry synchronization driver is installed in the virtual machine VM_A, the virtual machine VM_A can perform some or all of the following step S401 to step S405 by using the page table entry synchronization driver.

Step S401: Receive a second start message from the operating system OS_A of the virtual machine VM_A, where the second start message indicates a third page corresponding to a fifth page table entry that is to be invalidated in the operating system OS_A.

The operating system OS_A can determine the third page to be swapped out based on a memory management policy configured in the operating system OS_A. The third page can be included in shared memory Q2 or virtual address space allocated by the operating system OS_A to another application program, for example, the third page can be included in address space Q1 used by the untrusted part APP_A1. Referring to the above-mentioned descriptions of the registration page table entry synchronization driver, it can be understood that, the page table entry synchronization driver can monitor an event of an invalid page table entry in the operating system OS_A, for example, monitor, through "invalidate start" of a hook function, an event of a page table entry to be invalidated in the memory management subsystem in the operating system OS_A; and monitor, through "invalidate end" of the hook function, an event of a page table entry that has been invalidated in the operating system OS_A. As such, when the operating system OS_A expects to swap out the third page, that is, when the operating system OS_A is to invalidate the fifth page table entry corresponding to the third page in a certain page table maintained by the operating system OS_A, the operating system OS_A can send the second start message to the page table entry synchronization driver, for example, send the second start message by invoking "invalidate start" of the hook function.

The page table entry synchronization driver monitors a page table entry change status related to the entire operating system OS_A. In this solution, only a page table entry change status corresponding to a page included in shared memory Q2 needs to be paid attention to. Therefore, the page table entry synchronization driver can perform step S403 in response to the second start message from the operating system OS_A, and determine, based on the address information of shared memory Q2, whether the third page indicated by the second start message is page P2 included in shared memory Q2.

For example, when "invalidate start" of the hook function of the page table entry synchronization driver is invoked, it is first determined, based on the address information of shared memory Q2 maintained by the page table entry synchronization driver, whether the third page corresponding to the fifth page table entry to be invalidated in the operating system OS_A is included in shared memory Q2. For ease of description, when the third page to be swapped out is included in shared memory Q2, the third page is expressed as page P2 (that is, a second page) included in shared memory Q2 for distinguishing, and the fifth page table entry corresponding to the third page to be invalidated in the operating system OS_A is expressed as a fourth page table entry.

When the third page is not page P2 included in shared memory Q2, the page table entry synchronization driver can provide the operating system OS_A with a return message corresponding to the second start message, so that the operating system OS_A performs the following step S413.

The page table entry synchronization driver can maintain second state information corresponding to shared memory Q2, a value of the second state information includes a third state value or a fourth state value, the third state value is used to indicate that the address information of shared memory Q2 is allowed to be updated, and the fourth state value is used to indicate that the address information of shared memory Q2 is prohibited from being updated. The first state information can be maintained through reference counting or a state machine. In this case, the page table entry synchronization driver can further respond to the second start message, and can further perform step S405 to set the second state information to the fourth state value.

When the page table entry synchronization driver maintains the second state information through the state machine, the page table entry synchronization driver can specifically change the value of the second state information from the third state value to the fourth state value in step S405. When the page table entry synchronization driver maintains the second state information through reference counting, in step S405, the page table entry synchronization driver can specifically perform an operation of adding 1 to the current value of the second state information to obtain a new state value. It should be noted that, compared with the state machine, reference counting can more easily and conveniently maintain the second state information.

When the operating system OS_A is to invalidate the fourth page table entry corresponding to page P2 included in shared memory Q2, the virtual machine VM_A can perform step S407 to send a first start message to the virtual machine monitor, where the first start message indicates page P2.

Page P2 in step S407 can be determined by using the above-mentioned step S401 and step S403. In this case, in the virtual machine VM_A, the page table entry synchronization driver can specifically send the first start message to the virtual machine monitor. Page P2 in step S407 can alternatively be determined in another method. For example, a function of the memory management subsystem in the operating system OS_A can be extended, so that when the operating system OS_A is to invalidate the fourth page table entry corresponding to page P2 included in shared memory Q2, the memory management subsystem sends the first start message to the virtual machine monitor.

When the virtual machine monitor maintains the first state information, in response to the first start message from the virtual machine VM_A, the virtual machine monitor can perform the following step S409 to set the first state information to the second state value.

When the virtual machine monitor maintains the first state information through the state machine, the virtual machine monitor can specifically change the value of the first state information from the first state value to the second state value in step S409. When the virtual machine monitor maintains the first state information through reference counting, in step S409, the virtual machine monitor can specifically perform an operation of adding 1 to a current value of the first state information to obtain a new state value. It should be noted that, compared with the state machine, reference counting can more easily and conveniently maintain the first state information.

In response to the first start message from the virtual machine VM_A, the virtual machine monitor can further perform step S411 to invalidate the third page table entry corresponding to page P2 in page table a2.

After invalidating the third page table entry corresponding to invalid page P2 in page table a2, the virtual machine monitor can provide return information to the virtual machine, so that the virtual machine VM_A performs the following step S413 under triggering of the response message.

Step S413: The virtual machine VM_A invalidates the fifth page table entry corresponding to the third page. When the third page is included in page P2 of shared memory Q2, the fourth page table entry corresponding to page P2 is invalidated in page table a1 in step S413.

When a page table entry synchronization driver is installed in the virtual machine VM_A, the virtual machine VM_A can further perform some or all of the following step S415 to step S419 by using the page table entry synchronization driver.

Step S415: The page table entry synchronization driver receives a second end message from the operating system OS_A, where the second end message indicates the third page corresponding to the fifth page table entry that has been invalidated in operating system OS_A.

When the operating system OS_A swaps out the third page, that is, invalidates the fifth page table entry corresponding to the third page in a certain page table maintained by operating system OS_A, the operating system OS_A can send the second end message to the page table entry synchronization driver, for example, send the second end message by invoking "invalidate end" of the hook function.

The page table entry synchronization driver monitors a page table entry change status related to the entire operating system OS_A. In this solution, only a page table entry change status corresponding to a page included in shared memory Q2 needs to be paid attention to. Therefore, in response to the second end message from the operating system OS_A, the page table entry synchronization driver can perform step S417 to determine, based on the address information of shared memory Q2, whether the third page indicated by the second end message is page P2 included in shared memory Q2.

When the page table entry synchronization driver maintains the second state information corresponding to shared memory Q2, the page table entry synchronization driver can further perform step S419 in response to the second end message to set the second state information to the third state value.

When the page table entry synchronization driver maintains the second state information through the state machine, the page table entry synchronization driver can specifically change the value of the second state information from the fourth state value to the third state value in step S419. When the page table entry synchronization driver maintains the second state information through reference counting, in step S419, the page table entry synchronization driver can specifically perform an operation of subtracting 1 from the current value of the second state information to obtain a new state value.

After the virtual machine VM_A invalidates page P2 included in shared memory Q2, the virtual machine VM_A can perform step S421 to send a first end message to the virtual machine monitor, where the first end message indicates page P2.

When the page table entry synchronization driver determines, based on the address information of shared memory Q2 by using step S419, that the third page indicated by the second end message is page P2 included in shared memory Q2, the page table entry synchronization driver in the virtual machine VM_A can perform step S421. Alternatively, the function of the memory management subsystem in the operating system OS_A can be extended, so that the memory management subsystem performs step S421 when the fourth page table entry corresponding to page P2 has been invalidated.

In response to the first end message, the virtual machine monitor performs step S423 to set the first state information to the first state value indicating that a new page table entry is allowed to be validated in page table a2.

When the virtual machine monitor maintains the first state information through the state machine, the virtual machine monitor can specifically change the value of the first state information from the second state value to the first state value in step S423. When the virtual machine monitor maintains the first state information through reference counting, in step S423, the virtual machine monitor can specifically perform an operation of subtracting 1 from a current value of the first state information to obtain a new state value.

Figure 5:
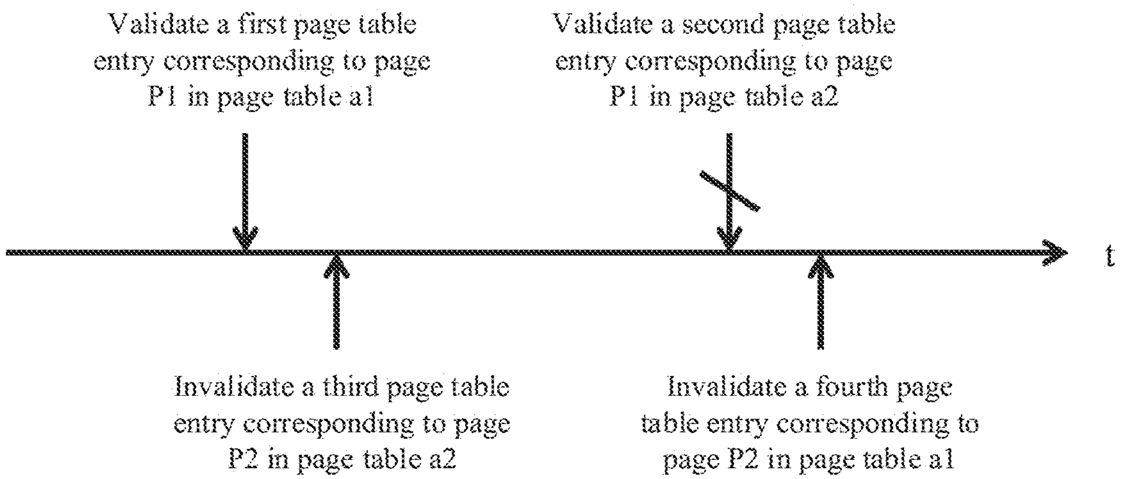
FIG. 5 is a sequence diagram illustrating that a computing device concurrently validate and invalidate page table entries corresponding to related pages.

If validating the page table entry corresponding to page P1 and invalidating a page table entry corresponding to page P2 are allowed to be performed concurrently in the computing device, when page P1 and page P2 are the same page, the untrusted part APP_A1 and the trusted part APP_A2 may be unable to communicate with each other accurately. As shown in FIG. 5, assume that the computing device validates the first page table entry corresponding to page P1 in page table a1 at a moment t1, invalidates the third page table entry corresponding to page P2 in page a2 at a moment t2, validates the second page table entry corresponding to page P1 in page table a2 at a moment t3, and invalidates the fourth page table entry corresponding to page P2 in page table a1 at a moment t4. When page P1 and page P2 are the same page PX, address mapping information included by the virtual machine monitor in the second page table entry validated at the moment t3 is the same as address mapping information included in the fourth page table entry to be invalidated at the moment t4. In this case, the trusted part APP_A2 can use page PX to receive or send data that the trusted part APP_A2 expects to exchange with the untrusted part APP_A1, but the untrusted part APP_A1 cannot access page PX, and consequently, the trusted part APP_A2 and the untrusted part APP_A1 cannot communicate with each other accurately.

Figure 4:
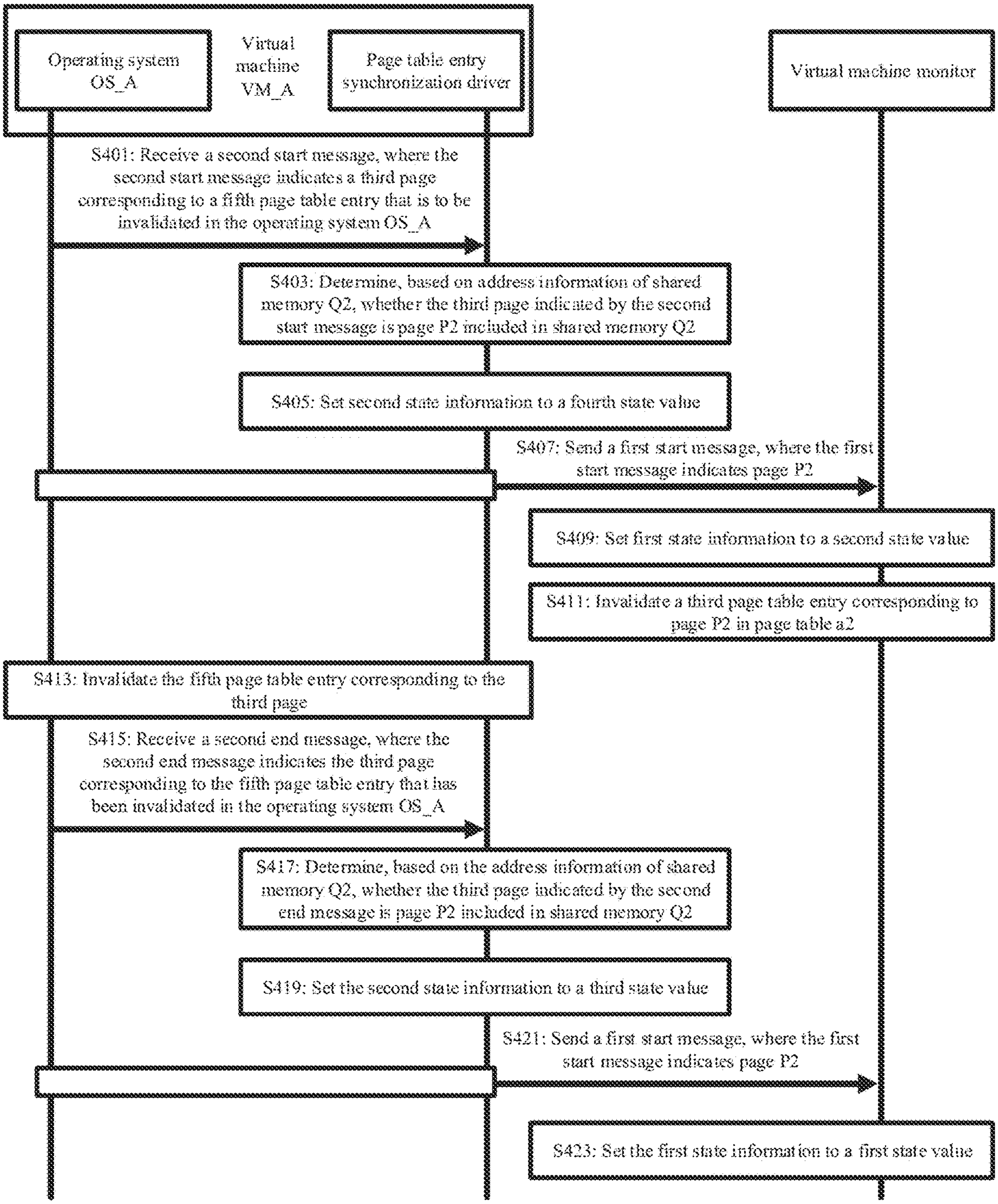
FIG. 4 is a second flowchart illustrating a method for managing a shared memory in a computing device, according to some embodiments of this specification.

In the above-mentioned method embodiments shown in FIG. 3 and FIG. 4, the first state information corresponding to page table a2 is maintained in the virtual machine monitor based on a corresponding policy, and the value of the first state information can indicate whether a new page table entry is allowed to be validated in page table a2, to prevent the computing device from concurrently validating and invalidating a page table entry corresponding to the same page, and ensure that the untrusted part APP_A1 and the trusted part APP_A2 of the target application program can communicate with each other accurately.

When the virtual machine VM_A maintains the address information of the shared memory and the second state information by using the page table entry synchronization driver, the computing device can further perform some or all of the following step S601 to step S609 through cooperation between the virtual machine VM_A and the virtual machine monitor of the computing device, to dynamically adjust a size of shared memory Q2 corresponding to the target application program.

Step S601: The virtual machine VM_A obtains an address update request, where the address update request is used to request to update the address information of shared memory Q2.

The address update request can be initiated by the untrusted part APP_A1, or can be initiated by the operating system OS_A based on a memory management policy configured in the operating system OS_A. For example, the untrusted part APP_A1 or the operating system OS_A can initiate a first address update request when identifying that a plurality of pages in shared memory Q2 have not been swapped in for a long time, to request to delete memory addresses corresponding to the plurality of pages from the address information of the shared memory to decrease shared memory Q2. For another example, the untrusted part APP_A1 or the operating system OS_A can initiate a second address update request when identifying that an occupation rate of shared memory Q2 is continuously greater than a predetermined value in a relatively long time period, to request to add a memory address of one or more pages that are currently not included in shared memory Q2 to the address information of the shared memory to increase shared memory Q2.

Step S603: The virtual machine VM_A determines, based on the second state information corresponding to shared memory Q2, whether the address information of shared memory Q2 is allowed to be updated.

If the address information of shared memory Q2 is allowed to be updated, the virtual machine VM_A can perform step S605 and step S607.

Step S605: Update, based on the address update request, the address information of shared memory Q2 that is configured in the virtual machine VM_A.

Step S607: Send an address update notification corresponding to the address update request to the virtual machine monitor.

Step S609: The virtual machine monitor updates, based on the address update notification, the address information of shared memory Q2 that is configured in the virtual machine monitor.

Some or all of the above-mentioned step S601 to step S607 can be performed by the page table entry synchronization driver. For example, the page table entry synchronization driver can hijack the address update request initiated by the untrusted part APP_A1 to the operating system OS_A, and wending determining that the address information of shared memory Q2 is allowed to be updated, forwards the address update request to the operating system OS_A, for example, to the memory management subsystem in the operating system OS_A, so that the operating system OS_A updates, based on the address update request, the address information of shared memory Q2 maintained by the operating system OS_A, and returns updated address information of shared memory Q2 to the page table entry synchronization driver. Further, the page table entry synchronization driver can update the address information of shared memory Q2 maintained by the page table entry synchronization driver to the updated address information of shared memory Q2 from the operating system OS_A, and send the updated address information of shared memory Q2 to the virtual machine monitor based on the address update notification.

Some or all of the above-mentioned step S601 to step S607 can be performed by the operating system OS_A. For example, a function of the memory management subsystem in the operating system OS_A can be extended. The memory management subsystem can generate an address update request based on a memory management policy configured in the memory management subsystem, or receive a memory update request initiated by the untrusted part APP_A1, and when determining that the address information of shared memory Q2 is allowed to be updated, update, based on the address update request, address information of shared memory Q2 maintained by the operating system OS_A and the page table entry synchronization driver, and send an address update notification to the virtual machine monitor directly or indirectly by using the page table entry synchronization driver, where the address update notification includes updated address information of shared memory Q2.

If updating the address information of shared memory Q2 and invalidating the page table entry corresponding to page P2 are allowed to be performed concurrently, when at least one page that is added to or deleted from shared memory Q2 based on the address update request includes the third page in step S401, the virtual machine monitor may fail to maintain the first state information normally.

Figure 7:
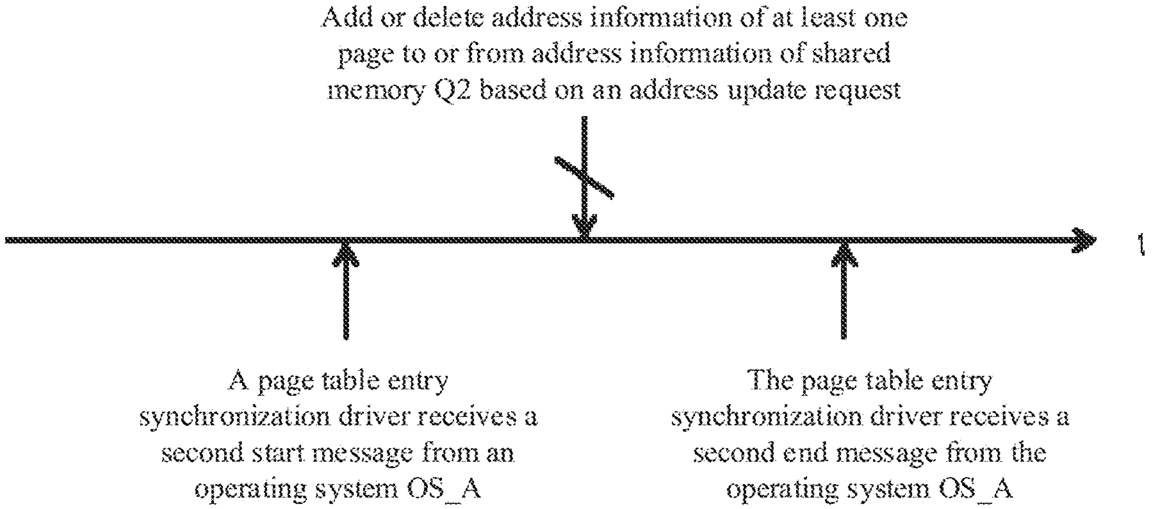
FIG. 7 is a sequence diagram illustrating that a computing device concurrently updates a shared memory and invalidates a page table entry corresponding to a related.

As shown in FIG. 7, assume that the page table entry synchronization driver receives the second start message from the operating system OS_A at a moment t5, the virtual machine VM_A adds or deletes, based on the address update request, address information of at least one page to or from the address information of shared memory Q2 maintained by the virtual machine VM_A at a moment t6, and the page table entry synchronization driver receives the second end message from the operating system OS_A at a moment t7. In addition, the address information of the at least one page added or deleted includes address information of the third page.

In a first aspect, if the address information of the at least one page deleted at the moment t6 includes the address information of the third page, the address information of shared memory Q2 maintained by the page table entry synchronization driver at the moment t5 includes the address information of the third page indicated by the second start message. In this case, the third page is determined as page P2 included in shared memory Q2, and the value of the first state information corresponding to shared memory Q2 in the virtual machine monitor is set to the second state value. However, the address information of shared memory Q2 maintained by the page table entry synchronization driver at the t7 moment may not include the address information of the third page. In this case, the third page indicated by the second end message is not determined as page P2 included in shared memory Q2, the value of the first state information corresponding to shared memory Q2 in the virtual machine monitor is not reset to the first state value, and consequently, the value of the first state information cannot accurately indicate whether a new page table entry is allowed to be added to page table a2.

In a second aspect, if the address information of the at least one page newly added at the moment t6 includes the address information of the third page, and the virtual machine monitor maintains the value of the first state information through reference counting, the address information of shared memory Q2 maintained by the page table entry synchronization driver at the moment t5 does not include the address information of the third page indicated by the second start message, the third page is not determined as page P2 included in shared memory Q2, and the value of the first state information corresponding to shared memory Q2 in the virtual machine monitor is not changed to the second state value by the virtual machine monitor by performing an operation of adding 1 to the first state value. However, the address information of shared memory Q2 maintained by the page table entry synchronization driver at the moment t7 includes the address information of the third page. In this case, the third page indicated by the second end message is determined as page P2 included in shared memory Q2, the value of the first state information corresponding to shared memory Q2 in the virtual machine monitor is changed to another state value different from the first state value and the second state value by the virtual machine monitor by performing an operation of subtracting 1 from the first state value, and consequently, the value of the first state information cannot normally indicate whether a new page table entry is allowed to be newly added to page table a2.

Figure 6:
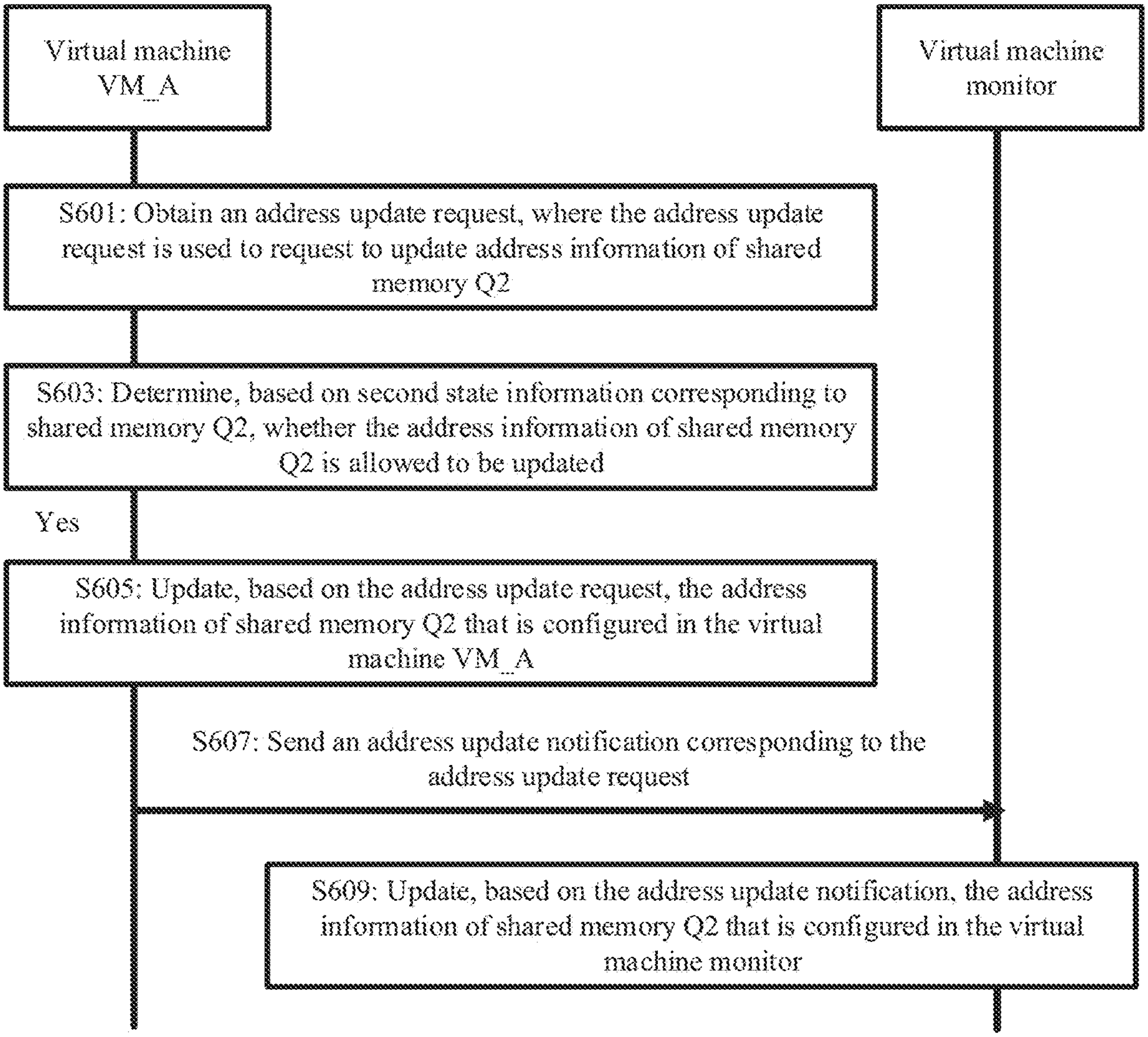
FIG. 6 is a third flowchart illustrating a method for managing a shared memory in a computing device, according to some embodiments of this specification.

In the above-mentioned method embodiments shown in FIG. 3, FIG. 4, and FIG. 6, the page table entry synchronization driver is used to maintain the second state information corresponding to shared memory Q2 based on a corresponding policy, and the value of the second state information can indicate whether the address information of shared memory Q2 is allowed to be updated, to prevent the computing device from concurrently updating the address information of shared memory Q2 and invalidating a page table entry corresponding to a page included in shared memory Q2, and ensure that the first state information maintained by the virtual machine monitor can accurately indicate whether a new page table entry is allowed to be validated in page table a2, thereby ensuring that the untrusted part APP_A1 and the trusted part APP_A2 of the target application program can communicate with each other accurately.

In the above-mentioned method embodiments shown in FIG. 3, FIG. 4, and FIG. 6, for any single method step performed by the virtual machine VM_A, when the method step is not limited to be capable of being performed by the page table entry synchronization driver or needs to be performed by the page table entry synchronization driver, the method step can be generally performed by the operating system OS_A of the virtual machine VM_A, for example, performed by the memory management subsystem in the operating system OS_A.

Figure 8:
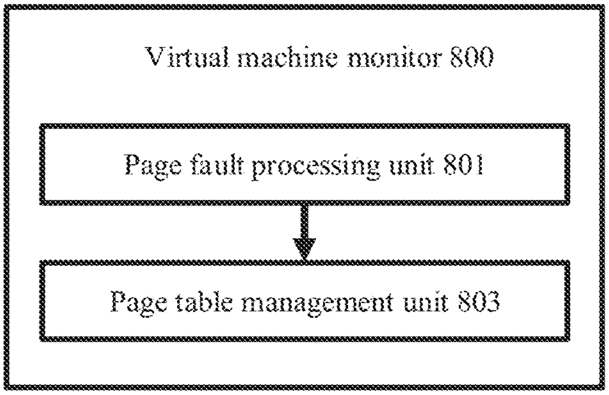
FIG. 8 is a schematic diagram illustrating a structure of a virtual machine monitor, according to some embodiments of this specification.

Based on the same concept as the above-mentioned method embodiments, some embodiments of this specification further provide a virtual machine monitor 800. As shown in FIG. 8, the virtual machine monitor 800 is deployed in a computing device. A virtual machine and a TEE are further deployed in the computing device, and an untrusted part and a trusted part of a target application program individually run in the virtual machine and the TEE. Address information of a shared memory is configured in the virtual machine and the virtual machine monitor 800, the virtual machine maintains a first page table of the untrusted part, and the virtual machine monitor maintains a second page table of the trusted part. The virtual machine monitor 800 includes: a page fault processing unit 801, configured to determine, based on the address information, whether a first address is included in the shared memory when a page fault occurs when the trusted part requests to access the first address, and if yes, send an interrupt notification to the virtual machine, so that the virtual machine ensures that a first page table entry has been validated in the first page table when determining, based on the address information, that the first address is included in the shared memory, and returns a response message to the virtual machine monitor, where the first page table entry includes address mapping information of a first page that includes the first address; and a page table management unit 803, configured to validate a second page table entry in the second page table based on the address mapping information in response to the response message.

Figure 9:
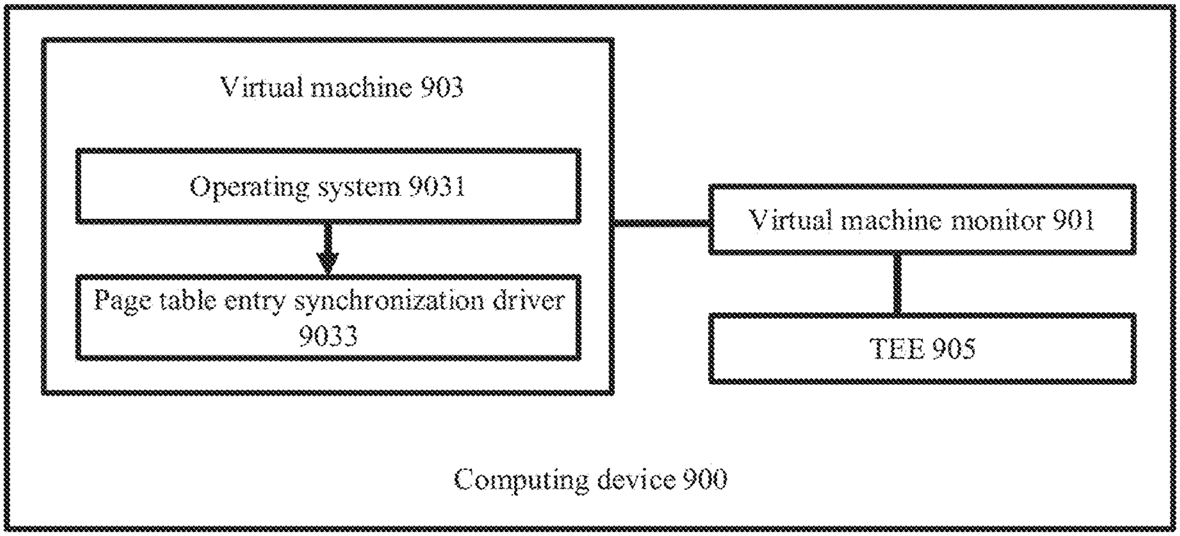
FIG. 9 is a schematic diagram illustrating a structure of a computer device, according to some embodiments of this specification.

Based on the same concept as the above-mentioned method embodiments, some embodiments of this specification further provide a computing device 900. As shown in FIG. 9, a virtual machine monitor 901, a virtual machine 903, and a TEE 905 are deployed in the computing device 900, and an untrusted part and a trusted part of a target application program individually run in the virtual machine 903 and the TEE 905. Address information of a shared memory is configured in the virtual machine 903 and the virtual machine monitor 901, the virtual machine 903 maintains a first page table of the untrusted part, and the virtual machine monitor 901 maintains a second page table of the trusted part. The virtual machine monitor 901 is configured to determine, based on the address information, whether a first address is included in the shared memory when a page fault occurs when the trusted part requests to access the first address, and if yes, send an interrupt notification to the virtual machine; the virtual machine 903 is configured to ensure that a first page table entry has been validated in the first page table when determining, based on the address information in response to the interrupt notification, that the first address is included in the shared memory, and return a response message to the virtual machine monitor, where the first page table entry includes address mapping information of a first page that includes the first address; and the virtual machine monitor 901 is further configured to validate a second page table entry corresponding to the first page in the second page table based on the address mapping information in response to the response message.

In some possible implementations, the virtual machine monitor 901 maintains first state information, a value of the first state information includes a first state value or a second state value, the first state value is used to indicate that a new page table entry is allowed to be validated in the second page table, and the second state value is used to indicate that a new page table entry is prohibited from being validated in the second page table. The virtual machine monitor 901 is further configured to determine, based on the first state information, whether the second page table entry is allowed to be validated before validating the second page table entry corresponding to the first page in the second page table based on the address mapping information.

In some possible implementations, the virtual machine 903 is further configured to send a first start message to the virtual machine monitor, where the first start message indicates a second page corresponding to a third page table entry that is to be invalidated by the virtual machine monitor, and the second page is included in the shared memory; the virtual machine monitor 901 is further configured to set the first state information to the second state value, and invalidate the third page table entry corresponding to the second page in the second page table; the virtual machine 903 is further configured to invalidate a fourth page table entry corresponding to the second page in the first page table, and send a first end message to the virtual machine monitor; and the virtual machine monitor 901 is further configured to set the first state information to the first state value in response to the first end message.

In some possible implementations, the virtual machine 903 includes an operating system 9031 and a page table entry synchronization driver 9033. The page table entry synchronization driver 9033 is configured to receive a second start message from the operating system 9031, where the second start message indicates a third page corresponding to a fifth page table entry that is to be invalid by the operating system 9031; the page table entry synchronization driver 9033 is further configured to determine, based on the address information in response to the second start message, whether the third page indicated by the second start message is the second page included in the shared memory; and the page table entry synchronization driver 9033 is further configured to send the first start message to the virtual machine monitor 901 when the third page indicated by the second start message is the second page included in the shared memory.

In some possible implementations, the page table entry synchronization driver 9033 is further configured to receive a second end message from the operating system 9031, where the second end message indicates the third page corresponding to the fifth page table entry that has been invalidated in the operating system 9031; the page table entry synchronization driver 9033 is further configured to determine, based on the address information in response to the second end message, whether the third page indicated by the second end message is the second page included in the shared memory; and the page table entry synchronization driver 9033 is further configured to send the first start message to the virtual machine monitor 901 when the third page indicated by the second end message is the second page included in the shared memory.

In some possible implementations, the page table entry synchronization driver 9033 maintains second state information, a value of the second state information includes a third state value or a fourth state value, the third state value is used to indicate that the address information of the shared memory is allowed to be updated, and the fourth state value is used to indicate that the address information of the shared memory is prohibited from being updated. The page table entry synchronization driver 9033 is further configured to set the second state information to the fourth state value in response to the second start message; and is further configured to set the second state information to the third state value in response to the second end message.

In some possible implementations, the virtual machine 903 is further configured to obtain an address update request, where the address update request is used to request to update the address information of the shared memory; determine, based on the second state information, whether the address information of the shared memory is allowed to be updated; update, based on the address update request, the address information of the shared memory that is configured in the virtual machine if the address information of the shared memory is allowed to be updated, and send an address update notification corresponding to the address update request to the virtual machine monitor; and the virtual machine monitor 901 is further configured to update, based on the address update notification, the address information of the shared memory that is configured in the virtual machine monitor.

A person skilled in the art should be aware that in the above-mentioned one or more examples, functions described in the this specification can be implemented by hardware, software, firmware, or any combination thereof. When the functions are implemented by software, computer programs corresponding to these functions can be stored in a computer-readable medium or transmitted as one or more instructions/code in the computer-readable medium, so that when the computer programs corresponding to these functions are executed by a computer, the method in any one of the embodiments of this specification is implemented by the computer.

Some embodiments of this specification further provide a computer-readable storage medium. The computer-readable storage medium stores computer programs/instructions, and when the computer programs/instructions are executed in a computing device, the computing device performs the method steps performed by the virtual machine or the virtual machine monitor provided in any one of the embodiments of this specification.

Some embodiments of this specification further provide a computing device, including a storage device and a processor. The storage device stores computer programs/instructions, and when executing the computer programs/instructions, the processor implements the method steps performed by the virtual machine or the virtual machine monitor provided in any one of the embodiments of this specification.

The embodiments of this specification all are described in a progressive way. For same or similar parts of the embodiments, mutual references can be made to the embodiments. Each embodiment focuses on a difference from other embodiments. In particular, the apparatus embodiments are basically similar to the method embodiments, and therefore are described briefly. For related parts, references can be made to partial descriptions in the method embodiments.

Specific embodiments of this specification are described above. Other embodiments fall within the scope of the appended claims. In some cases, the actions or steps described in the claims can be performed in an order different from that in the embodiments, and the desired results can still be achieved. In addition, processes described in the accompanying drawings do not necessarily need a specific order or a sequential order shown to achieve the desired results. In some implementations, multi-tasking and parallel processing are also possible or may be advantageous.

The above-mentioned specific implementations further describe in detail the objectives, technical solutions, and beneficial effects of this specification. It should be understood that the descriptions above are merely specific implementations of this specification and are not intended to limit the protection scope of this specification. Any modifications, equivalent replacements, or improvements made on the basis of the technical solutions in this specification shall fall within the protection scope of this specification.

The terms "first" and "second" in the embodiments of this specification are used only for the purpose of description, and shall not understood as an indication or implication of relative importance or an implicit indication of indicated technical features. Therefore, a feature defined with "first" or "second" can explicitly or implicitly include one or more of the features. The terms "include", "contain", "have", and their variations all mean "include but not limited to", unless otherwise specifically emphasized in other ways.

What is claimed is:

1. A method for managing a shared memory in a computing device, wherein the computing device comprises a virtual machine monitor, a virtual machine, and a trusted execution environment (TEE), an untrusted part and a trusted part of a target application program independently run in the virtual machine and the TEE, the virtual machine maintains a first page table of the untrusted part, and the virtual machine monitor maintains a second page table of the trusted part, wherein the shared memory comprises a first page configured to allow the trusted part and the untrusted part to exchange information by accessing the same first page, and wherein the method comprises:

determining, by the virtual machine monitor based on address information of the shared memory configured in the virtual machine and the virtual machine monitor, whether a first address is comprised in the shared memory when a page fault occurs in response to the trusted part requesting to access the first address;

in response to determining that the first address is comprised in the shared memory, sending, by the virtual machine monitor, an interrupt notification to the virtual machine;

in response to the interrupt notification and determining, based on the address information, that the first address is comprised in the shared memory, determining, by the virtual machine, whether a first page table entry in the first page table has been validated, wherein the first page table entry corresponds to a first page that comprises the first address;

in response to determining that the first page table entry has not been validated, validating, by the virtual machine, the first page table entry in the first page table;

returning, by the virtual machine, a response message to the virtual machine monitor, wherein the first page table entry comprises address mapping information of the first page that comprises the first address, wherein the response message comprises the address mapping information included in the validated first page table entry; and validating, by the virtual machine monitor, a second page table entry corresponding to the first page in the second page table based on the address mapping information, in response to the response message, wherein the second page table entry is used to support the trusted part in accessing the first page.

2. The method according to claim 1, wherein the virtual machine monitor maintains first state information, a value of the first state information comprises a first state value or a second state value, the first state value indicates that a new page table entry is allowed to be validated in the second page table, and the second state value indicates that a new page table entry is prohibited from being validated in the second page table; and wherein the method further comprises:

before the validating a second page table entry in the second page table, determining, based on the first state information, whether the second page table entry is allowed to be validated.

3. The method according to claim 2, wherein the method further comprises:

sending, by the virtual machine to the virtual machine monitor, a first start message indicating a second page corresponding to a third page table entry to be invalidated by the virtual machine monitor, and the second page is comprised in the shared memory;

setting, by the virtual machine monitor, the first state information to the second state value;

invalidating the third page table entry corresponding to the second page in the second page table;

invalidating, by the virtual machine, a fourth page table entry corresponding to the second page in the first page table;

sending a first end message to the virtual machine monitor; and setting, by the virtual machine monitor, the first state information to the first state value in response to the first end message.

4. The method according to claim 3, wherein the virtual machine comprises an operating system and a page table entry synchronization driver; and wherein the method further comprises:

receiving, by the page table entry synchronization driver, a second start message from the operating system, wherein the second start message indicates a third page corresponding to a fifth page table entry to be invalidated in the operating system; and in response to the second start message, determining, by the page table entry synchronization driver based on the address information, whether the third page indicated by the second start message is the second page comprised in the shared memory, wherein sending the first start message to the virtual machine monitor comprises:

sending the first start message to the virtual machine monitor when the third page indicated by the second start message is the second page comprised in the shared memory.

5. The method according to claim 4, wherein the method further comprises:

receiving, by the page table entry synchronization driver, a second end message from the operating system, wherein the second end message indicates the third page corresponding to the fifth page table entry that has been invalidated in the operating system; and determining, by the page table entry synchronization driver based on the address information in response to the second end message, whether the third page indicated by the second end message is the second page comprised in the shared memory, wherein sending the first end message to the virtual machine monitor comprises:

sending the first start message to the virtual machine monitor when the third page indicated by the second end message is the second page comprised in the shared memory.

6. The method according to claim 5, wherein the page table entry synchronization driver maintains second state information, a value of the second state information comprises a third state value or a fourth state value, the third state value indicates that the address information of the shared memory is allowed to be updated, and the fourth state value indicates that the address information of the shared memory is prohibited from being updated; and wherein the method further comprises:

setting, by the page table entry synchronization driver, the second state information to the fourth state value in response to the second start message; and setting, by the page table entry synchronization driver, the second state information to the third state value in response to the second end message.

7. The method according to claim 6, wherein the method further comprises:

obtaining, by the virtual machine, an address update request, wherein the address update request is configured to request to update the address information of the shared memory;

determining, by the virtual machine based on the second state information, whether the address information of the shared memory is allowed to be updated;

updating, by the virtual machine based on the address update request, the address information of the shared memory configured in the virtual machine if the address information of the shared memory is allowed to be updated;

sending an address update notification corresponding to the address update request to the virtual machine monitor; and updating, by the virtual machine monitor based on the address update notification, the address information of the shared memory configured in the virtual machine monitor.

8. A computing device comprising:

one or more processors coupled to one or more memories that are configured to implement:

a virtual machine monitor, a virtual machine, and a trusted execution environment (TEE), wherein:

an untrusted part and a trusted part of a target application program independently run in the virtual machine and the TEE, the virtual machine maintains a first page table of the untrusted part, and the virtual machine monitor maintains a second page table of the trusted part, wherein a shared memory comprises a first page configured to allow the trusted part and the untrusted part to exchange information by accessing the same first page;

the virtual machine monitor is configured to:

determine, based on address information of shared memory configured in the virtual machine and the virtual machine monitor, whether a first address is comprised in the shared memory when a page fault occurs in response to the trusted part requesting to access the first address; and in response to determining that the first address is comprised in the shared memory, send, by the virtual machine monitor, an interrupt notification to the virtual machine;

the virtual machine is configured to:

in response to the interrupt notification and determining, based on the address information, that the first address is comprised in the shared memory, determine whether a first page table entry in the first page table has been validated, wherein the first page table entry corresponds to a first page that comprises the first address;

in response to determining that the first page table entry has not been validated, validate the first page table entry in the first page table; and return a response message to the virtual machine monitor, wherein the first page table entry comprises address mapping information of the first page that comprises the first address, wherein the response message comprises the address mapping information included in the validated first page table entry; and the virtual machine monitor is further configured to validate a second page table entry corresponding to the first page in the second page table based on the address mapping information in response to the response message, wherein the second page table entry is used to support the trusted part in accessing the first page.

9. The computing device according to claim 8, wherein the virtual machine monitor maintains first state information, a value of the first state information comprises a first state value or a second state value, the first state value indicates that a new page table entry is allowed to be validated in the second page table, and the second state value indicates that a new page table entry is prohibited from being validated in the second page table; and the virtual machine monitor is further configured to determine, based on the first state information, whether the second page table entry is allowed to be validated before validating the second page table entry corresponding to the first page in the second page table.

10. The computing device according to claim 9, wherein the virtual machine is further configured to send a first start message to the virtual machine monitor, wherein the first start message indicates a second page corresponding to a third page table entry to be invalidated by the virtual machine monitor, and the second page is comprised in the shared memory;

the virtual machine monitor is further configured to set the first state information to the second state value, and invalidate the third page table entry corresponding to the second page in the second page table;

the virtual machine is further configured to:

invalidate a fourth page table entry corresponding to the second page in the first page table; and send a first end message to the virtual machine monitor; and the virtual machine monitor is further configured to set the first state information to the first state value in response to the first end message.

11. The computing device according to claim 10, wherein the virtual machine comprises an operating system and a page table entry synchronization driver;

the page table entry synchronization driver is configured to receive a second start message from the operating system, wherein the second start message indicates a third page corresponding to a fifth page table entry to be invalidated in the operating system;

the page table entry synchronization driver is further configured to determine, based on the address information in response to the second start message, whether the third page indicated by the second start message is the second page comprised in the shared memory; and the page table entry synchronization driver is further configured to send the first start message to the virtual machine monitor when the third page indicated by the second start message is the second page comprised in the shared memory.

12. The computing device according to claim 11, wherein the page table entry synchronization driver is further configured to receive a second end message from the operating system, wherein the second end message indicates the third page corresponding to the fifth page table entry that has been invalidated in the operating system;

the page table entry synchronization driver is further configured to determine, based on the address information in response to the second end message, whether the third page indicated by the second end message is the second page comprised in the shared memory; and the page table entry synchronization driver is further configured to send the first start message to the virtual machine monitor when the third page indicated by the second end message is the second page comprised in the shared memory.

13. The computing device according to claim 12, wherein the page table entry synchronization driver maintains second state information, a value of the second state information comprises a third state value or a fourth state value, the third state value indicates that the address information of the shared memory is allowed to be updated, and the fourth state value indicates that the address information of the shared memory is prohibited from being updated; and the page table entry synchronization driver is further configured to:

set the second state information to the fourth state value in response to the second start message; and set the second state information to the third state value in response to the second end message.

14. The computing device according to claim 13, wherein the virtual machine is further configured to:

obtain an address update request, wherein the address update request is configured to request to update the address information of the shared memory;

determine, based on the second state information, whether the address information of the shared memory is allowed to be updated;

update, based on the address update request, the address information of the shared memory configured in the virtual machine if the address information of the shared memory is allowed to be updated; and send an address update notification corresponding to the address update request to the virtual machine monitor; and the virtual machine monitor is further configured to update, based on the address update notification, the address information of the shared memory configured in the virtual machine monitor.

15. A non-transitory, computer-readable medium storing one or more instructions executable by a computing device comprising a virtual machine monitor, a virtual machine, and a trusted execution environment (TEE), an untrusted part and a trusted part of a target application program independently run in the virtual machine and the TEE, the virtual machine maintains a first page table of the untrusted part, and the virtual machine monitor maintains a second page table of the trusted part, wherein a shared memory comprises a first page configured to allow the trusted part and the untrusted part to exchange information by accessing the same first page and wherein the one or more instructions are executable by the computing device to perform operations comprising:

determining, by the virtual machine monitor based on address information of shared memory configured in the virtual machine and the virtual machine monitor, whether a first address is comprised in the shared memory when a page fault occurs in response to the trusted part requesting to access the first address;

in response to determining that the first address is comprised in the shared memory, sending, by the virtual machine monitor, an interrupt notification to the virtual machine;

in response to the interrupt notification and determining, based on the address information, that the first address is comprised in the shared memory, determining, by the virtual machine, whether a first page table entry in the first page table has been validated, wherein the first page table entry corresponds to a first page that comprises the first address;

in response to determining that the first page table entry has not been validated, validating, by the virtual machine, the first page table entry in the first page table;

returning, by the virtual machine, a response message to the virtual machine monitor, wherein the first page table entry comprises address mapping information of the first page that comprises the first address, wherein the response message comprises the address mapping information included in the validated first page table entry; and validating, by the virtual machine monitor, a second page table entry corresponding to the first page in the second page table based on the address mapping information, in response to the response message, wherein the second page table entry is used to support the trusted part in accessing the first page.

16. The non-transitory, computer-readable medium according to claim 15, wherein the virtual machine monitor maintains first state information, a value of the first state information comprises a first state value or a second state value, the first state value indicates that a new page table entry is allowed to be validated in the second page table, and the second state value indicates that a new page table entry is prohibited from being validated in the second page table; and wherein the operations further comprising:

before the validating a second page table entry in the second page table, determining, based on the first state information, whether the second page table entry is allowed to be validated.

17. The non-transitory, computer-readable medium according to claim 16, wherein the operations further comprising:

sending, by the virtual machine to the virtual machine monitor, a first start message indicating a second page corresponding to a third page table entry to be invalidated by the virtual machine monitor, and the second page is comprised in the shared memory;

setting, by the virtual machine monitor, the first state information to the second state value;

invalidating the third page table entry corresponding to the second page in the second page table;

invalidating, by the virtual machine, a fourth page table entry corresponding to the second page in the first page table;

sending a first end message to the virtual machine monitor; and setting, by the virtual machine monitor, the first state information to the first state value in response to the first end message.

18. The non-transitory, computer-readable medium according to claim 17, wherein the virtual machine comprises an operating system and a page table entry synchronization driver; and wherein the operations further comprising:

receiving, by the page table entry synchronization driver, a second start message from the operating system, wherein the second start message indicates a third page corresponding to a fifth page table entry to be invalidated in the operating system; and in response to the second start message, determining, by the page table entry synchronization driver based on the address information, whether the third page indicated by the second start message is the second page comprised in the shared memory, wherein sending the first start message to the virtual machine monitor comprises:

sending the first start message to the virtual machine monitor when the third page indicated by the second start message is the second page comprised in the shared memory.

19. The non-transitory, computer-readable medium according to claim 18, wherein the operations further comprising:

receiving, by the page table entry synchronization driver, a second end message from the operating system, wherein the second end message indicates the third page corresponding to the fifth page table entry that has been invalidated in the operating system; and determining, by the page table entry synchronization driver based on the address information in response to the second end message, whether the third page indicated by the second end message is the second page comprised in the shared memory, wherein sending the first end message to the virtual machine monitor comprises:

sending the first start message to the virtual machine monitor when the third page indicated by the second end message is the second page comprised in the shared memory.

20. The non-transitory, computer-readable medium according to claim 19, wherein the page table entry synchronization driver maintains second state information, a value of the second state information comprises a third state value or a fourth state value, the third state value indicates that the address information of the shared memory is allowed to be updated, and the fourth state value indicates that the address information of the shared memory is prohibited from being updated; and wherein the operations further comprise:

setting, by the page table entry synchronization driver, the second state information to the fourth state value in response to the second start message; and setting, by the page table entry synchronization driver, the second state information to the third state value in response to the second end message.

* * * * *